June 4, 1935.  T. F. BIRMINGHAM  2,003,820
METHOD OF MAKING WELDED ARTICLE
Filed Jan. 2, 1932  2 Sheets-Sheet 1

INVENTOR
THOMAS F. BIRMINGHAM.
BY
ATTORNEY

June 4, 1935.  T. F. BIRMINGHAM  2,003,820
METHOD OF MAKING WELDED ARTICLE
Filed Jan. 2, 1932  2 Sheets-Sheet 2

INVENTOR
THOMAS F. BIRMINGHAM,
BY O. V. Thiele
ATTORNEY

Patented June 4, 1935

2,003,820

UNITED STATES PATENT OFFICE 2,003,820

METHOD OF MAKING WELDED ARTICLE

Thomas F. Birmingham, Hammond, Ind., assignor to The Superheater Company, New York, N. Y.

Application January 2, 1932, Serial No. 584,499

2 Claims. (Cl. 29—157.6)

My invention relates to a method of forming ferrous articles having a portion or section composed of chrome vanadium steel united directly to one of carbon steel by a joint of the forge weld type.

All attempts at making articles in which a portion or section of chrome vanadium steel is united to another such section by a joint of the forge weld type having been unsuccessful, attempts in this direction have been discontinued and other types of welding operations substituted for the forge welding method. Difficulty has been experienced furthermore in forming articles having a chrome vanadium section or portion united directly to a portion or section of carbon steel by a forge weld joint. The difficulty in producing a forge weld between carbon steel and chrome vanadium steel together with the apparent impossibility of producing articles having two sections or portions of chrome vanadium steel united directly by a joint of the forge weld type, have caused workers in the trades to substantially discontinue their efforts to weld chrome vanadium to carbon steel by forge welding.

I have discovered, however, that it is possible to make an article having two sections, one of chrome vanadium steel and the other of carbon steel, united directly by a joint of the forge weld type.

In accordance with my invention, two sections, one of chrome vanadium steel and one of carbon steel, which are to be united by forge welding are brought to welding temperature, are covered with solid type flux and fresh unoxidized surfaces are formed by cutting into each such section to partly loosen therefrom a portion which nevertheless retains its integral union with the original section in part and bending the partly loosened portion outwardly from the main section. Such fresh surfaces are then pressed together under conditions preventing oxidation, and while they are at welding temperature, to form a joint of the forge weld type.

In order that my invention may be more clearly understood, I will now describe in detail, by way of example and in connection with the accompanying drawings, an article and a method of making such article in accordance with my invention.

In the drawing

Figure 7:
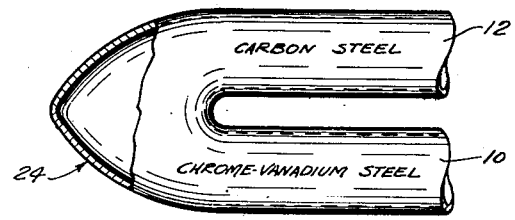
Fig. 7 illustrates a completed return bend produced by shearing off a piece of the end of the article shown in Fig. 6.

The return bend illustrated in Fig. 7 comprises a portion 10 of chrome vanadium steel and a portion 12 of ordinary carbon steel united by a joint of the forge weld type. At such joints the metal of one section interpenetrates with that of the other.

In the manufacture of the said return bend, two pipe sections 10 and 12 are first provided, one of chrome vanadium steel and the other of carbon steel, such pipe sections corresponding to the portions 10 and 12 of the finished article. The ends of such sections which are to be united to form the return bend are first brought to welding temperature coated with flux 13, placed in a female die formed of recessed sections 14 and 16, and held rigidly close together in parallel position while at such temperature. Each such pipe section is then slit for a certain distance along the longitudinal element which intersects the line uniting the centers of the two pipes by means of a male die 18, thereby producing fresh entirely unoxidized surfaces. Die 18 is so formed that at the same time that the pipe sections are slit, the fresh surfaces thus provided on each pipe section are bent outwardly and towards those formed on the other pipe section so as to bring the fresh surfaces of the chrome vanadium steel and of the carbon steel into contact, whereupon they are quickly forced together firmly to form a joint of the forge weld type between the two sections, thereby forming a breeches piece 20.

The pipe sections united as just described are of course open at the end at which they have been welded, as well as at the ends which are in their original form. Such an article can be employed for certain purposes without further manufacture, but it is often desirable to forge and/or swage such an article into another form. Contrary to what might be expected of the known stiffness of chrome vanadium steel at ordinary forging temperatures, an article having two portions, one of chrome vanadium and the other of carbon steel united by a weld of the forge type made as above described, can be forged and/or swaged without disrupting the welding. Care must be taken, however, to reheat the article during the forging or swaging whenever the temperature falls into the lower range of forging temperature for carbon steel, otherwise the article will become unsymmetrical due to the unequal resistance of the chrome vanadium steel to the forging pressure as compared to the carbon steel. Other undesirable effects may also be produced if the temperature of the metal parts is not maintained, such as thermal stresses. As indicated by the drawing, two pipes which have been united by a forge weld, as above described, can be forged or swaged so as to close the end at the point where the pipes have been welded so as to form a complete return bend.

It is necessary in the formation of a forge weld joint between chrome vanadium and carbon steels to carefully protect the freshly cut surfaces which are to be welded to prevent their oxidation. Both carbon steel and chrome vanadium steel at welding temperatures are quite sensitive to oxidation, and even when the freshly cut surfaces are brought together with the maximum speed which is commercially possible the surfaces along which the cutting or slitting operation is begun will often fail to unite completely unless further precautions are taken to prevent oxidation. I find it is possible, however, to make a commercial article simply by cutting the chrome vanadium steel section and the carbon steel section as above described and bringing the parts together quickly to weld them and then cropping off a portion at the outer end where the weld has failed to form or is imperfect. I have found, further, that it is possible to protect the surfaces so that such cropping is unnecessary by using a suitable solid type flux on the parts to be welded. A satisfactory flux for this purpose is one now sold under the name "Ez Weld". While the chemical composition of the flux known as "Ez Weld" has not been obtained by applicant, its characteristics are such that it is believed to contain a considerable percentage of borax and a substance acting to reduce the melting point of the borax somewhat at welding temperatures so that the flux forms a continuous protective film over the parts to be welded at the time such parts are to be slit.

Suitable apparatus for heating and welding the pipe sections as above described and for forging and swaging pipe sections so united to make a closed return bend are fully disclosed in prior Patents Nos. 1,155,109, 1,155,110, 1,169,209, 1,255,355, and 1,339,054.

Figure 1:
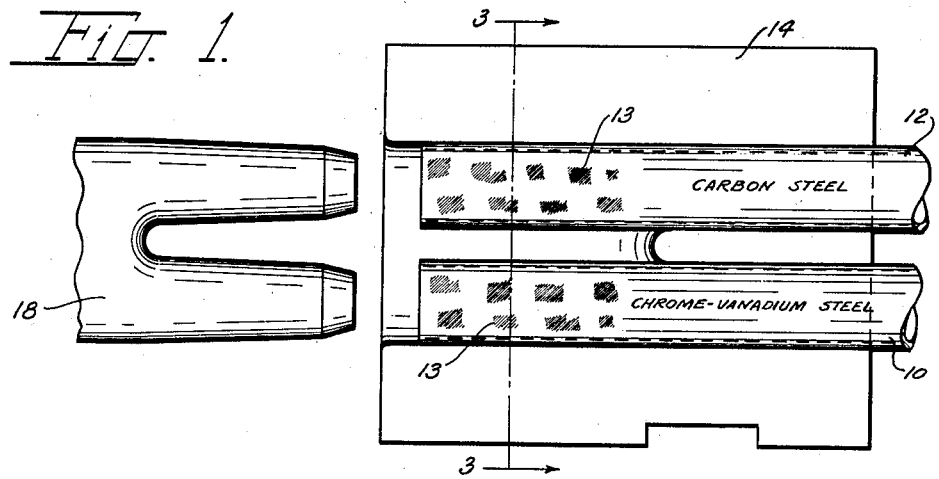
Fig. 1 is an elevational view on the line 1—1 of Fig. 3 illustrating two tubes about to be welded by means of dies in accordance with my invention, one half of the front die being omitted for purposes of illustration.
Figure 2:
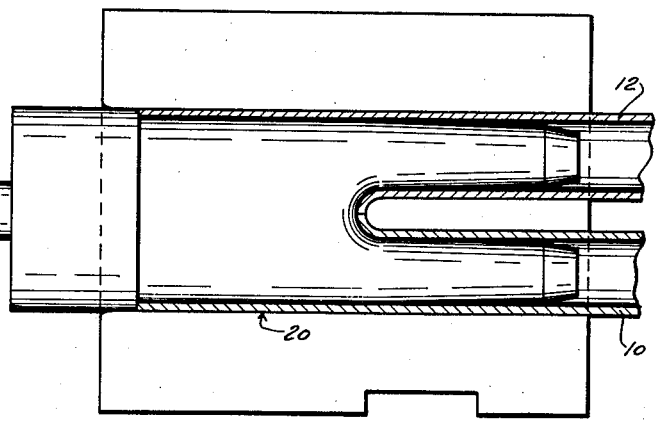
Fig. 2 is a view similar to Fig. 1 showing the dies in the position assumed after the weld has been made.
Figure 3:
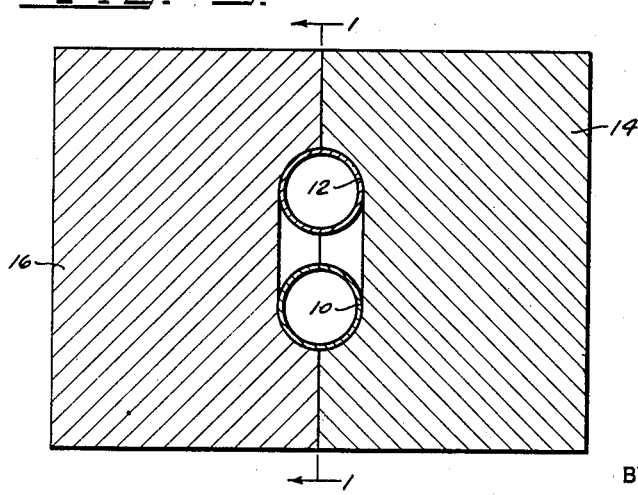
Fig. 3 is a section on a line 3—3 of Fig. 1 looking in the direction of the arrows.
Figure 4:
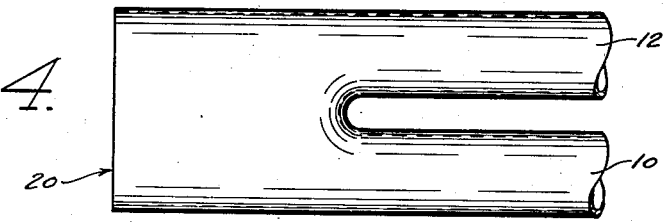
Fig. 4 is an elevation of the article produced by joining two tubes by the dies shown in Figs. 1, 2 and 3.
Figure 5:
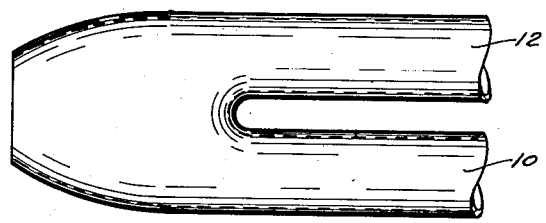
Fig. 5 is an elevational view illustrating the effects of swaging the article shown in Fig. 4.
Figure 6:
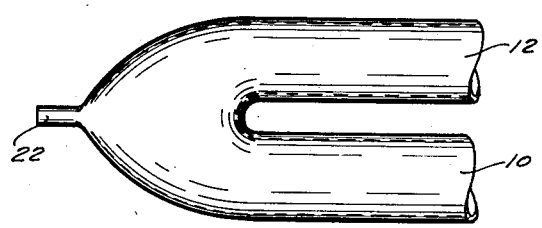
Fig. 6 illustrates the results of further swaging and forging of the article shown in Fig. 5.

The formation of closed return bends by forging and swaging after the original pipe sections have been united by welding preferably is carried out as follows:

The article consisting of the pipe sections as first united by a forge weld joint is permitted to become cold. It is then reheated and restruck in the same dies with the breeches pin a quarter inch longer on the shoulder whereby the metal is upset to form a breeches piece about ¼" shorter than resulted from the first operation. The piece having been upset, it is then given a preliminary swaging at a temperature within the upper portion of the temperature range used in swaging carbon steel pieces of like size and thickness to change the shape to that illustrated in Fig. 5. After the preliminary swaging, the piece is allowed to cool down approximately to room temperature and then reheated to welding temperature and swaged lightly in order to thicken the end so that the piece can hold a substantially welding temperature over a period of time satisfactory for the next step. The piece having been thickened by swaging, it is then reheated to welding temperature and again swaged so as to completely close the opening at the welded ends of the pipe sections. A pin 22 (Fig. 6) of excess metal is, however, extruded in such final swaging and such pin should be cut off, thereby forming a complete return bend 24, as shown in Fig. 7. The completed return bend is then annealed at 650 degrees F. for a period of fifteen minutes and cooled in air.

What I claim is:

1. The method of forming articles having portions of chrome-vanadium steel united directly to portions of carbon steel which comprises covering with a flux of the type which is non-fluid at ordinary atmospheric temperatures the sections of chrome-vanadium and carbon steels to be welded, cutting said sections while at welding temperature and quickly pressing together fresh surfaces of carbon steel and of chrome-vanadium steel so provided to weld them together.

2. The method of forming a return bend joining two tubes one of chrome-vanadium steel and the other of carbon steel which comprises covering with a flux of a type which is non-fluid at ordinary atmospheric temperatures the sections of two tubes to be welded, cutting said sections longitudinally while at welding temperature, quickly pressing the fresh surfaces of carbon steel so provided against those of chrome-vanadium steel, to weld them together, and finally swaging and forging the so welded tubes to form a complete return bend.

THOMAS F. BIRMINGHAM.